United States Patent
Pronkine

(10) Patent No.: US 9,002,096 B2
(45) Date of Patent: Apr. 7, 2015

(54) METHOD AND APPARATUS FOR DETERMINING A LIQUID LEVEL IN A CONTAINER USING IMAGING

(75) Inventor: Viatcheslav Pronkine, Edgewater, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 484 days.

(21) Appl. No.: 13/143,353

(22) PCT Filed: Dec. 11, 2009

(86) PCT No.: PCT/US2009/067645
§ 371 (c)(1),
(2), (4) Date: Jul. 6, 2011

(87) PCT Pub. No.: WO2010/080340
PCT Pub. Date: Jul. 15, 2010

(65) Prior Publication Data
US 2011/0268329 A1 Nov. 3, 2011

Related U.S. Application Data

(60) Provisional application No. 61/142,698, filed on Jan. 6, 2009.

(51) Int. Cl.
G06K 9/00 (2006.01)
G01F 23/00 (2006.01)
G01F 23/292 (2006.01)

(52) U.S. Cl.
CPC .......... *G01F 23/0076* (2013.01); *G01F 23/292* (2013.01)

(58) Field of Classification Search
CPC ............ G01F 23/0061; G01F 23/0069; G01F 25/0061; G01F 25/0076; G06T 7/00–7/001; G06T 2207/30108–2207/30164
USPC .................................. 250/900–908; 356/249
See application file for complete search history.

(56) References Cited

U.S. PATENT DOCUMENTS 4,628,465 A * 12/1986 Ito et al. ......................... 382/141
4,998,285 A * 3/1991 Suzuki et al. .................. 382/171

(Continued)

FOREIGN PATENT DOCUMENTS

| DE | 4314249 | 4/1993 |
|---|---|---|
| JP | Hei 3-059411 A | 3/1991 |

(Continued)

OTHER PUBLICATIONS

International Search Report, International Application No. PCT/US09/67645.

(Continued)

*Primary Examiner* — Stephen R Koziol
*Assistant Examiner* — Sean Conner
(74) *Attorney, Agent, or Firm* — Dugan & Dugan, PC

(57) ABSTRACT

Methods, systems and apparatus for determining a level of a sample are provided. An image of a sample housed in a container is captured, wherein the image is represented as a two dimensional array of intensities of light. An area of interest is extracted from the image. A filter is applied to the area of interest. The filtered area is collapsed into a one dimensional array. The one dimensional array is masked. The level of the sample in the container is determined based on the masked one dimensional array. Numerous other aspects are provided.

19 Claims, 7 Drawing Sheets

(56) References Cited

U.S. PATENT DOCUMENTS

| | | | |
|---|---|---|---|
| 5,072,108 A * | 12/1991 | Ishikawa | 250/223 B |
| 5,204,911 A * | 4/1993 | Schwartz et al. | 382/142 |
| 5,414,778 A * | 5/1995 | Schwartz et al. | 382/142 |
| 5,542,004 A * | 7/1996 | Constant et al. | 382/141 |
| 5,696,841 A * | 12/1997 | Nakatsuka | 382/174 |
| 5,781,665 A * | 7/1998 | Cullen et al. | 382/254 |
| 5,796,856 A * | 8/1998 | Graff et al. | 382/108 |
| 5,809,166 A * | 9/1998 | Huang et al. | 382/178 |
| 5,845,002 A * | 12/1998 | Heck et al. | 382/110 |
| 5,889,884 A * | 3/1999 | Hashimoto et al. | 382/168 |
| 6,049,379 A * | 4/2000 | Lucas | 356/240.1 |
| 6,098,029 A * | 8/2000 | Takagi et al. | 702/127 |
| 6,226,081 B1 * | 5/2001 | Fantone et al. | 356/239.6 |
| 6,249,604 B1 * | 6/2001 | Huttenlocher et al. | 382/174 |
| 6,252,980 B1 * | 6/2001 | Schwartz et al. | 382/141 |
| 6,275,603 B1 * | 8/2001 | Cronshaw et al. | 382/142 |
| 6,633,655 B1 * | 10/2003 | Hong et al. | 382/118 |
| 6,782,122 B1 * | 8/2004 | Kline et al. | 382/142 |
| 6,801,649 B1 * | 10/2004 | Michael et al. | 382/142 |
| 6,909,805 B2 * | 6/2005 | Ma et al. | 382/170 |
| 7,049,622 B1 * | 5/2006 | Weiss | 250/577 |
| 7,522,762 B2 * | 4/2009 | Rea et al. | 382/141 |
| 7,840,360 B1 * | 11/2010 | Micheels et al. | 702/25 |
| 8,036,444 B2 * | 10/2011 | Nielsen | 382/142 |
| 2002/0090331 A1 | 7/2002 | Smalley et al. | |
| 2003/0112523 A1 | 6/2003 | Daniell | |
| 2003/0113007 A1 * | 6/2003 | Iwasaki et al. | 382/141 |
| 2004/0066964 A1 * | 4/2004 | Neubauer et al. | 382/152 |
| 2004/0208350 A1 * | 10/2004 | Rea et al. | 382/128 |
| 2006/0013454 A1 | 1/2006 | Flewelling et al. | |
| 2009/0225196 A1 * | 9/2009 | Bell | 348/239 |
| 2010/0195883 A1 * | 8/2010 | Patriarche et al. | 382/131 |
| 2010/0322462 A1 * | 12/2010 | Wu et al. | 382/100 |
| 2011/0164806 A1 * | 7/2011 | Peleg et al. | 382/141 |

FOREIGN PATENT DOCUMENTS

| | | |
|---|---|---|
| JP | Hei 3-058042 A | 9/1991 |
| JP | Hei 07-198617 A | 8/1995 |
| JP | Hei 8-278186 A | 10/1996 |
| JP | 2001-508648 | 7/2001 |
| JP | 2006-138814 A | 6/2006 |
| JP | 2008-261696 A | 10/2008 |
| WO | 03/060433 | 7/2003 |

OTHER PUBLICATIONS

Supplementary European Search Report: Cuilian Zhao et al: "A New Liquid Level Measuring System of Standard Metal Tank based on Sub-pixel Edge Detection", Control and Automation, 2007. ICCA 2007. IEEE International Conference on, IEEE, Piscataway, NJ, USA May 30, 2007, pp. 3207-3212.

Supplementary European Search Report: Sakol Udomsiri et al: "Design of FIR Filter for Water Level Detection", World Academy of Science, Engineering and Technology 48 2008, Jan. 1, 2008, pp. 47-52.

English translation of Japanese Office Action of corresponding Japan patent Application No. 2011-545359 12 Pages.

* cited by examiner

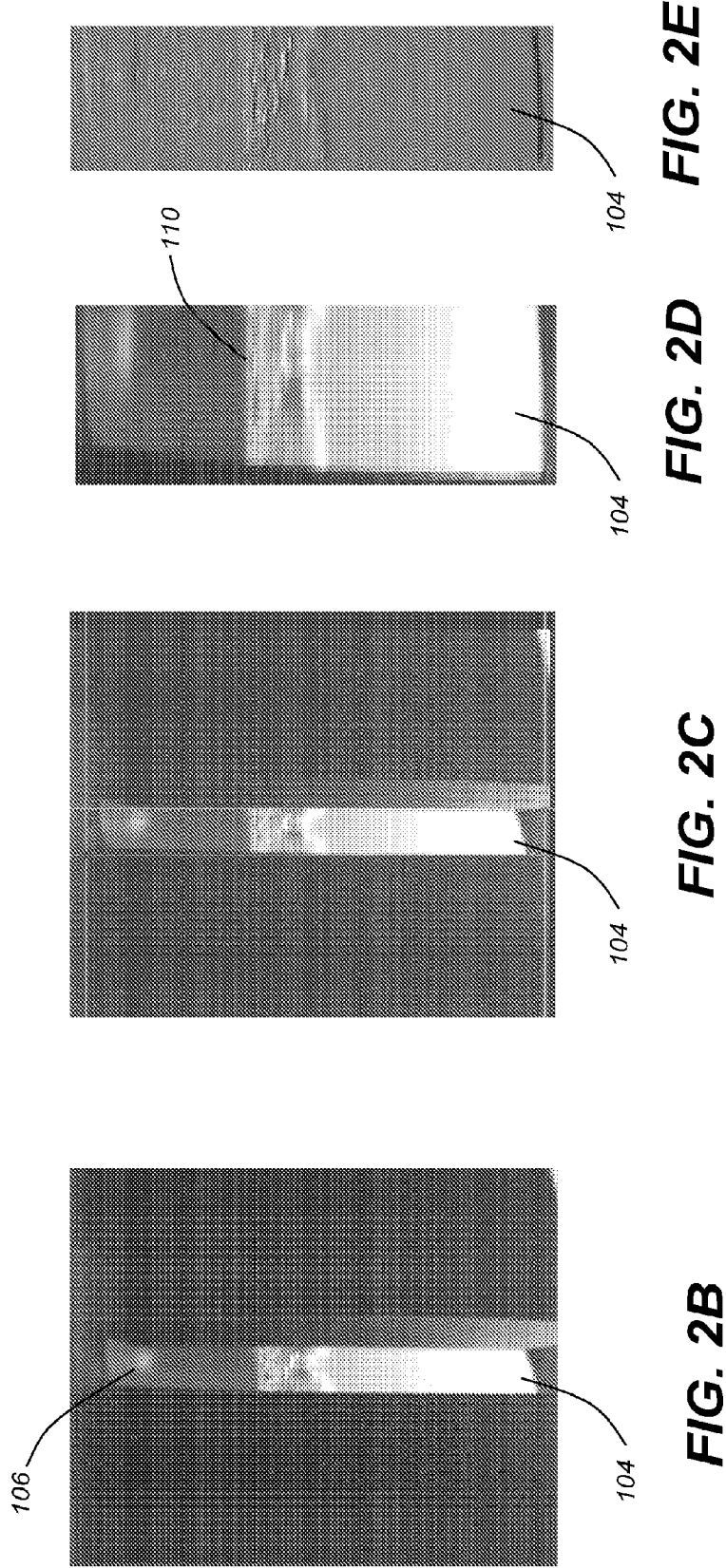

METHOD AND APPARATUS FOR DETERMINING A LIQUID LEVEL IN A CONTAINER USING IMAGING

FIELD OF THE INVENTION

The present invention relates to liquid volume measurement, and more specifically to methods and apparatus for detecting and measuring the level of a liquid in a container using imaging.

BACKGROUND

Various tests may be performed on a sample for diagnostic purposes, routine care, research, etc. In the medical field, the sample may include, for example, blood, urine, DNA, feces, tissue, etc. In other fields, such as bio-terrorism, samples may include, for example, air, water, soil, etc. Frequently, as part of the test, the sample may be mixed with a reagent to produce an outcome. In an in vitro setting, the mixing may take place outside of a patient's body, for example. Additionally, the different tests may require different quantities of a sample, which may be collected in various containers. In some instances, the container may have a sample capacity greater than is necessary for a particular test. It may be desirable to know the quantity of sample in a container, for example, to determine an appropriate amount of reagent to add, to make appropriate calculations, to act as an automated confirmation of the liquid levels, or to meet regulatory requirements.

The inventors of the present invention have determined that an existing problem with conventional automated and non-automated liquid level sensing for in vitro diagnostics is that the conventional methods may be complex, and therefore expensive. Additionally, conventional liquid level sensing methods may be unreliable in detecting increasingly smaller volumes, particularly without destruction of, or physical contact with, the samples. For example, the conventional visual method whereby an observer views a sample and records the liquid level of the sample may be inaccurate and time consuming.

The electro-capacitive method may be another conventional method for sensing a liquid level of a sample. With the electro-capacitive method a probe may be inserted into the sample, thereby contacting the sample, which may be destructive to the sample to some degree. Additionally, contact with the sample may increase the possibility of carryover between the different samples being tested. In other words, some of a first sample tested may remain on the probes used with the capacitive method, for example, and be carried-over to the second sample being tested by the same probes. The electro-capacitive method detects the level of the sample by measuring the position of the probe at the moment of contact with the sample that in turn produces a change in capacitance on the probe. However, the electro-capacitive method may be limited by the difficulty in detecting very small changes in capacitance, as well as unavoidable bulk parasitic changes and interferences in the environment when detecting the liquid level of the sample (ie. foam or dust on the surface of the sample; or turbulence in the sample).

Pressure sensors may be another conventional way to sense the liquid level of a sample. Pressure sensors measure the pressure of the sample wherever the pressure gauge is located. Similar to the probes used in the electro-capacitive method, the components of the pressure sensors may contact the sample and thereby destroy the sample or result in cross-contamination. Additionally, pressure sensors may have difficulty in detecting the liquid level due to interference, such as foreign objects or solids, in the sample, which may interfere with the sensors.

Another conventional way to sense the liquid level of a sample may be to use ultrasound, whereby a sound pulse is sent into the sample and a sensor examines time for an echo to return. Unlike electro-capacitive methods and pressure sensors, with ultrasound, no contact with the sample is necessary. However, ultrasonic level sensing may be difficult to implement, as it depends on air properties that may change with temperature and humidity. Additionally, the resolution associated with ultrasonic level sensing may be fairly low. Accordingly, a need exists for an improved method and apparatus for determining the amount of sample in a container.

SUMMARY OF THE INVENTION

In an aspect of the present invention, a method for determining a level of a sample is provided. The method comprises capturing an image of a sample housed in a container, wherein the image is represented as a two dimensional array of intensities of light; extracting an area of interest from the image; applying a filter to the area of interest; collapsing the filtered area into a one dimensional array; masking the one dimensional array; and determining the level of the sample in the container based on the masked one dimensional array.

In another aspect of the present invention, a system for determining a level of a sample is provided. The system includes an image capture apparatus adapted to capture the image of a sample in a container, wherein the image is represented as a two dimensional array of intensities of light; and a controller coupled to the image capture apparatus, wherein the controller is adapted to extract an area of interest from the image, apply a filter to the area of interest, collapse the filtered area of interest into a one dimensional array, apply a mask to the one dimensional array, and determine the level of the sample in the container based on the masked one dimensional array.

In another aspect of the present invention, a method for determining a level of a sample is provided. The method comprises: capturing an image of a sample housed in a container, wherein the image is represented as a two dimensional array of intensities of light; extracting an area of interest from the image; applying a filter to the area of interest; splitting the image into more tha one narrower vertical arrays; analyzing each vertical array for peaks; counting and combining, per vertical unit, the peaks resulting from the analysis; forming a histogram from the combined peaks; analyzing the histogram for peak concentrations; and determining the level of the sample in the container based on the analysis.

In yet another aspect of the present invention, a method for determining the presence and amount of foam on a surface of a sample is provided. The method comprises: capturing an image of a sample housed in a container, wherein the image is represented as a two dimensional array of intensities of light; extracting an area of interest from the image; applying a filter to the area of interest; collapsing the filtered area of interest into a one dimensional array; masking the one dimensional array; determining an interface of the sample and ambient air based on the masked one dimensional array; and detecting a range of continuous concentration of peaks in the one dimensional array in at least one direction moving away from the interface, and wherein the continuous concentration is the foam.

Other features and aspects of the present invention will become more fully apparent from the following detailed description, the appended claims, and the accompanying drawings.

BRIEF DESCRIPTION OF THE DRAWINGS

FIGS. 2B through 2F are perspective views of the method described in FIG. 2A in accordance with some embodiments of the present invention.

DETAILED DESCRIPTION

Figure 1A:
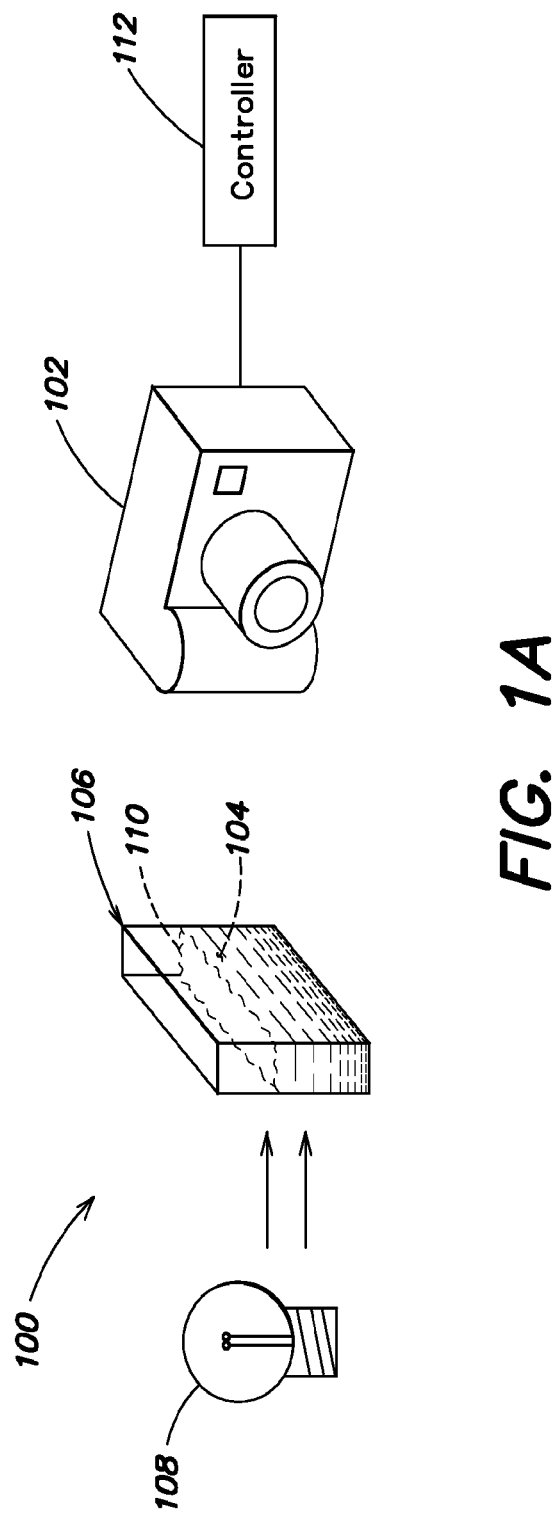
FIG. 1A is a block diagram illustrating a system for determining the level of a sample according to some embodiments of the present invention.

The present invention provides systems, apparatus, and methods for sensing the liquid level of a sample in a container. In particular, the present invention provides a method whereby an image of the sample retained in a container is captured. The image may be captured by any conventional means (e.g. video camera, digital still camera, line scanner, etc.). The container may be made from a transparent material to allow the passage of light through the sample. By capturing an image of the sample, the sample may be observed/measured without physical contact with the sample. In some embodiments, the image may be converted to a two dimensional array of light intensities.

An area of interest may then be extracted or cropped from the two dimensional array, and if necessary, the geometry of the area of interest may be adjusted. The area of interest may include the sample within the container, including both the bottom of the container and the interface between the sample and the ambient air. The geometry of the two dimensional array may need to be adjusted such that the horizontal array information may be disregarded and only the vertical array information may be analyzed, as the vertical axis contains the information about the level of liquid in the container. To emphasize or detect features (e.g., changes in intensities, such as an air-sample interface or the bottom of the container) in the vertical domain, the two dimensional array may then be processed with a high-pass or a differential filter, for example, in the vertical domain. While the term "differential filter" will be used throughout the application, other methods for detecting the features may be used, for example, artificial intelligence algorithms. Note that the use of the term "differential filter," is merely exemplary and in no way limits the invention to only using or requiring use of a differential filter. In accordance with the invention, other known means of processing a two dimensional array may be used to emphasize or detect features in the vertical domain.

The differentially filtered two dimensional array may then be collapsed horizontally to form a vertical one dimensional array. Each element of the one dimensional array may be the normalized sum (or average) of all the line elements of the two dimensional array. Note that in alternate embodiments, for example, the two dimensional array may first be collapsed into a one dimensional array, and then the one dimensional array may be processed with the differential filter or the like.

In other embodiments, for example, when the image is captured through a single line optical sensor (line scan array), the image may be interpolated horizontally through a cylindrical lens. In this case, data will be present only in one dimension, which is not possible in the case of conventional vision systems. A mask may be applied to the one dimensional differential array or signal to account for any noise (e.g., dust, foreign matter, bubbles) that may be in the sample. The resulting signal may be examined for peaks. Certain peaks may be selected for further processing based on the height of the peak, to determine the bottom of the container and the interface/level of the liquid and ambient air.

In some instances, objects (e.g., dust, foam bubbles, etc.) may be large enough to cover the full width of the container, and/or the contrast of the objects to the ambient air is comparable to the contrast of the main liquid-ambient air interface. As will be described below, in some embodiments, when the object covers the full width of the container, the object may be labeled as foam. In some embodiments it may be desirable to determine the amount of foam as it contains enough sample to be significant in terms of calculating the amount of sample in a container. In instances where the air-liquid interface is less well defined, another embodiment of the present invention may be used to determine the liquid level of the sample. In this embodiment, instead of selecting peaks based on a particular peak height, the peaks may be selected based on the frequency of their appearance per vertical unit, as will be further explained below. In this embodiment, the steps are the same as described above with respect to the first embodiment, up to and including the step where the two dimensional array may be processed with a differential filter in the vertical dimension. The two dimensional array may then be split into "n" narrower vertical arrays, such that each of the "n" vertical arrays may be separately analyzed for peaks. The differentially filtered "n" two dimensional arrays may then be collapsed horizontally to form "n" vertical one dimensional differential arrays. As described above, the "n" two dimensional arrays may be collapsed into "n" one dimensional arrays before being processed with the differential filter, resulting in "n" one dimensional differential arrays. As above, a mask may be applied to the "n" one dimensional differential arrays to account for noise. The peaks in the resulting "n" signals may be combined and counted (per vertical unit) in a histogram, for example. The resulting histogram may then be further processed to determine the bottom of the container and interface/level of the liquid and ambient air, the presence of foam and/or other objects.

Additionally, the peak frequency method described above may be used to detect the presence of and size of objects on the surface of the sample (hereinafter referred to as "foam" for purposes of example only). The presence of and size of foam may be determined by first examining the histogram to detect the liquid/ambient air interface, which may be recognized as the first major peak on the histogram when the bottom of the container is excluded. Then the histogram may be examined from the liquid/ambient air interface in both directions (towards the top and bottom of the container) to detect a continuous concentration of peaks, whereby the continuous concentration is at least two peaks, and where the distance between peaks is not larger than a preset number, (e.g., at least two pixels), defined by the maximum size of bubbles. If such a range is found, then it may be reported as foam. The number of peaks in the range of the continuous concentration of peaks may be a function of the expected foam size, the number of vertical arrays and the application of a low pass filter to the histogram.

Figure 1B:
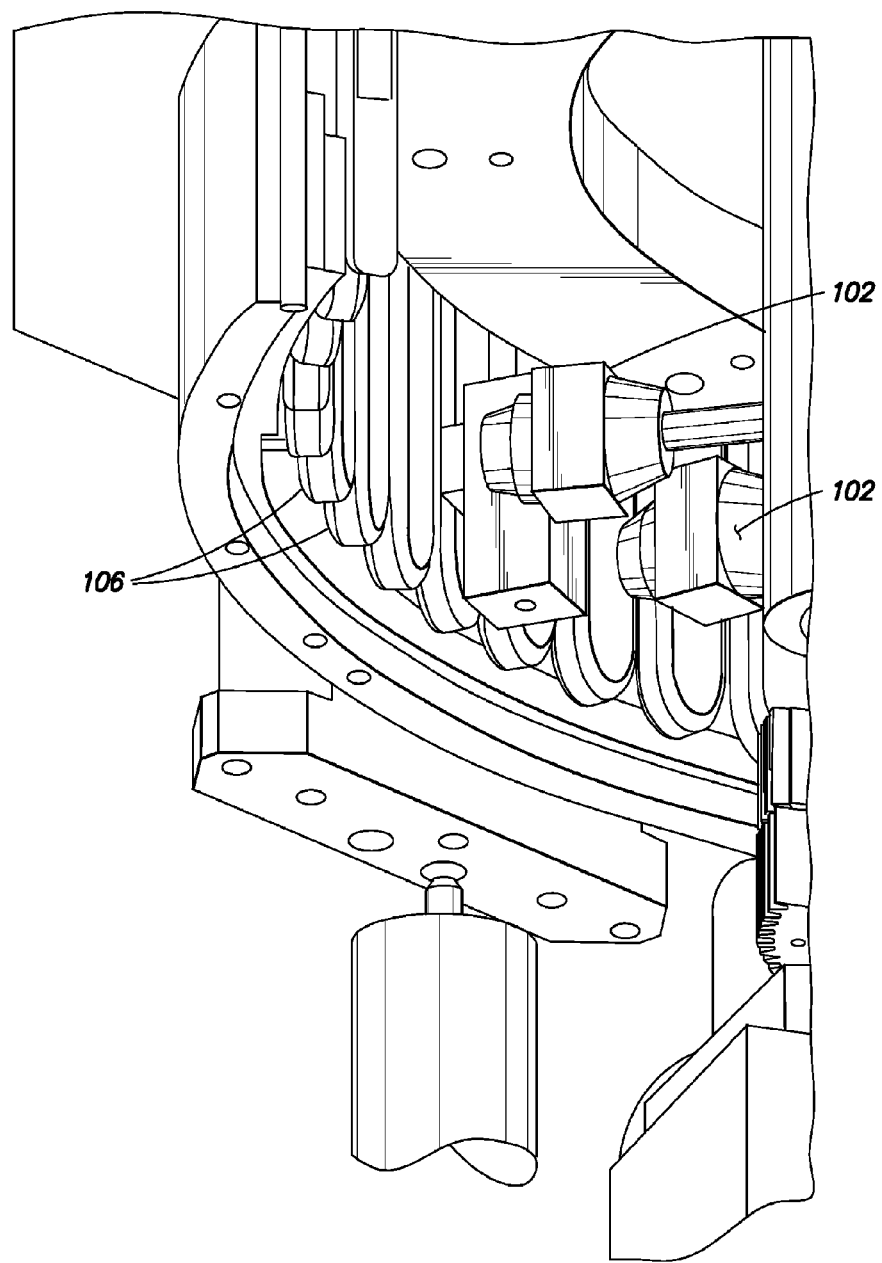
FIG. 1B is a schematic view of the system described in FIG. 1A.

Turning to FIGS. 1A and 1B, a block diagram and a schematic view, respectively, illustrating a system 100 for determining the level of a sample according to some embodiments of the present invention are provided. The system 100 may include an image capture apparatus 102, to capture an image of a sample 104 retained in a container 106 and optionally illuminated by light source 108. To identify the interface 110 between the sample 104 and the ambient air in the container 106, the image capture apparatus 102 may optionally be coupled to and operated by a controller 112.

As described above, the image capture apparatus 102 may include any conventional image capture means. For example, the image capture apparatus 102 may be a video camera, a digital still camera, a line scanner, a CCD array, etc. As shown in FIG. 1B, the system 100 may include one or more image capture apparatuses 102. Conventional vision systems may capture the image as a two dimensional array. In other embodiments, for example when the image is captured through a single line optical sensor (e.g., line scan array), the image may be interpolated horizontally through a cylindrical lens. In this case, the data from the image will be present only in one dimension.

The captured image may depict the sample 104 retained in the container 106. As shown in FIG. 1B, the system 100 may include one or more containers 106 retaining samples 104 therein. As described above, the sample may include, for example, blood, urine, DNA, feces, tissue, air, water, soil, etc. Any other suitable sample may be used. The container 106 may be any container suitable to retain the sample therein, and allow the passage of light through the sample. In other words, for example, the container 106 may be made from a transparent material to allow the passage of light therethrough, such that the amount of sample 104 in the container 106 may be determined, as will be described in more detail below. As depicted in FIG. 1B, the samples 104 may be held in containers 106 mounted on a carousel or a conveyor, with the image capture apparatus 102 disposed to scan the containers 106 as they pass, to help automate the handling and measurement of the samples.

As indicated above, in some embodiments, the system 100 may further include a light source 108. The light source 108 may illuminate the sample 104 to further highlight an interface 110 between the sample 104 and the ambient air for the image capture apparatus 102. While the light source 108 is schematically depicted in the same horizontal plane as the container 106, other orientations may be used. For example, the light source 108 may be positioned below the container 106, which may better highlight the interface 110. As will be further described below, the air/sample interface 110 may be used to determine the amount of sample 104 in the container 106.

As indicated above, in some embodiments, the system 100 may also include a controller 112. In some embodiments, the system 100 may be operated by the controller 112, which may be coupled to and/or otherwise communicate with and/or control any or all of the various components of the system 100. The controller 112 may also be adapted to receive the image data from the image capture apparatus 102 and analyze the data to determine the liquid/sample level in the container 106 and translate the height of the sample 104 into the volume of the sample 104, as will be further described below. The controller 112 may include a microcomputer, microprocessor, logic circuit, a computer, any combination of hardware and software, or the like. The controller 112 may include various communications facilities including input/output ports, a keyboard, a mouse, a display, a network adapter, etc. In some embodiments, the controller 112 may be operative to execute program instructions to perform the methods of the present invention described herein.

Figure 2A:
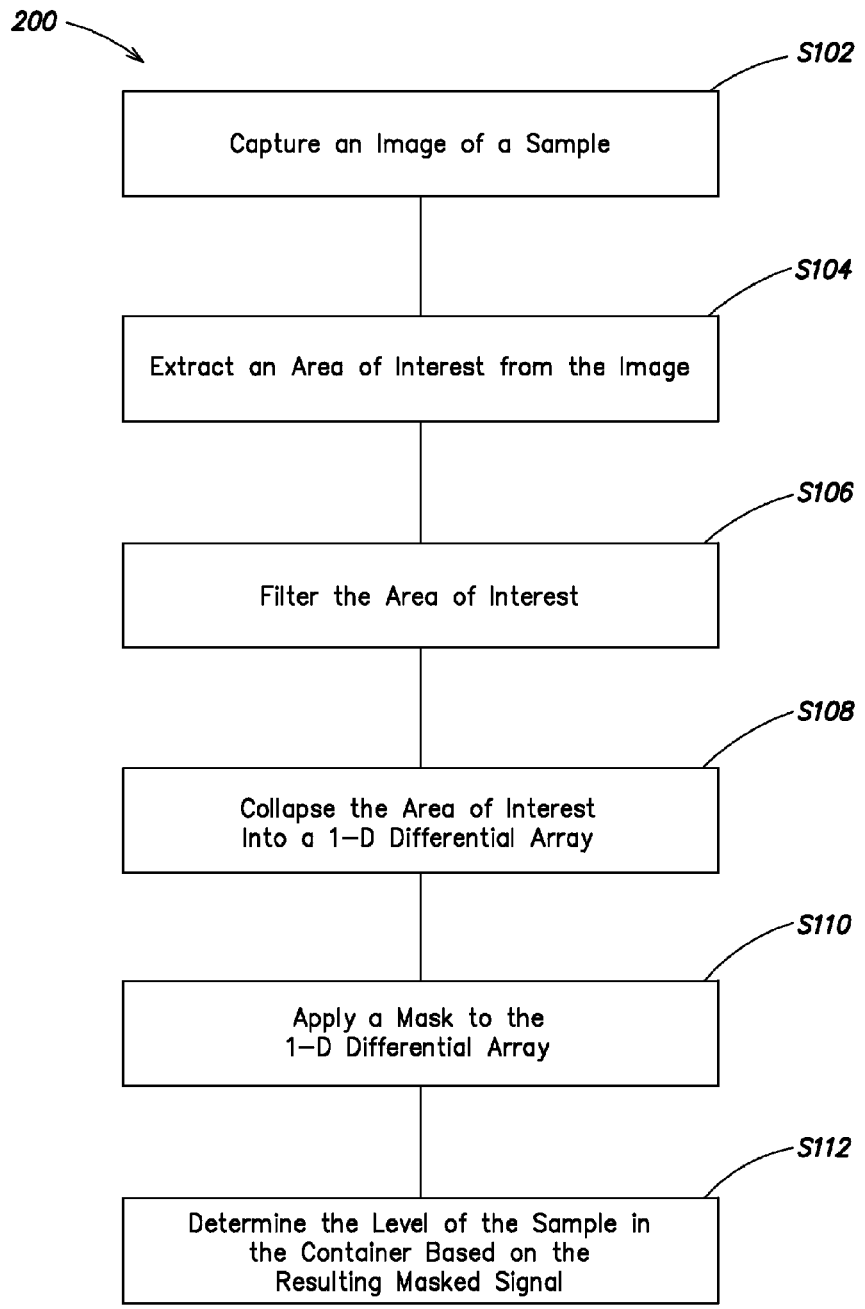
FIG. 2A is a flow chart depicting an example method in accordance with some embodiments of the present invention.

Turning to FIG. 2A, a flowchart is provided depicting an example method 200 of the present invention. As described above, the sample 104 may be contained in the container 106. In step S102, the image capture apparatus 102 captures an image of the sample 104 (FIG. 2B). The image captured by the image capture apparatus 102 may be represented as a two dimensional array indicating different intensities of light (FIG. 2C). In step S104, the image may be cropped and the geometry adjusted to extract an area of interest from the image (FIG. 2D). As indicated above, the geometry adjustment may be optional, as the cropped image may be sufficient. In instances where the cropped image may not be sufficient, the geometry may be adjusted such that the horizontal information in the image may be disregarded, and the image analyzed in a single dimension. The single dimension of interest may be the vertical dimension or axis, which contains the information regarding the height or level of the sample 104 in the container 106. The information from the image, in either the vertical or horizontal dimension, may be referred to as "signals." In some embodiments, the horizontal axis may be analyzed. If the image represented as the two dimensional array of intensities (FIG. 2C) is skewed or deviates from the actual physical horizontal/vertical alignment in some other way, the signal of interest in the vertical dimension may be attenuated and/or mixed with signals from the horizontal axis. In this situation, it may be necessary to apply a skew and/or deviation correction to the array to compensate for any observable or known distortions. For example, two major visible features with a high contrast that may span for a large horizontal length, and may appear skewed in the image, may be the bottom of the container 106 and the air/sample interface 110.

In step S106, the differential filter, for example, may be used to filter the area of interest, in the vertical dimension, to emphasize or detect the air-sample interface and bottom of the container (FIG. 2E). Any suitable differential or high pass filter or the like may be used. For example, a finite impulse response (FIR) filter, a Butterworth filter, a Chebyshev filter, a Bessel filter and/or an Elliptic filter may be used. As is well known in the art, digital filters (e.g., FIR, Butterworth, Chebyshev, Bessel, and Elliptic) may achieve many filtering effects that can be expressed as a mathematical function or algorithm.

Figure 2F:
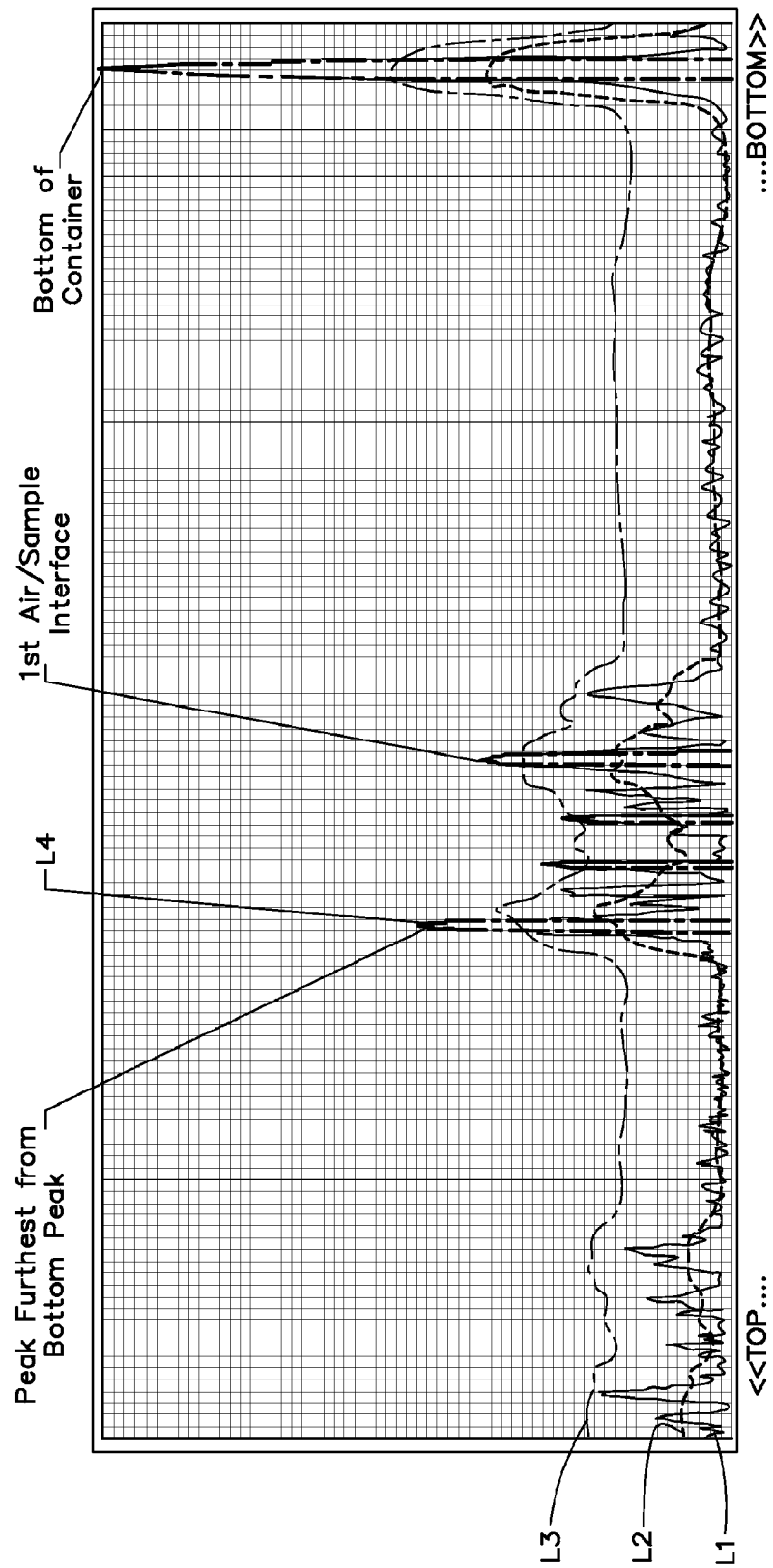

In step S108, the filtered area of interest may be collapsed horizontally into a vertical one dimensional differential array, such as line 1 (L1), for example, in the graph shown in FIG. 2F. It should be noted that the application of the differential filter results in an array having both positive and negative peaks. In the graph shown herein (FIG. 2F), the absolute value of the differential one dimensional array is used such that all the peaks are positive. However, in other embodiments the differential one dimensional array may be analyzed with negative peaks. As indicated above, in some embodiments, the two dimensional array may be collapsed into a one dimensional array before application of the differential filter. Each element of the differential one dimensional array may be the normalized sum (or average) of all the line elements of the source (two dimensional) array.

The graph may indicate the vertically differential values of the various light intensities, wherein the "top" and "bottom" indicate the top and bottom of the container 104. However, L1 (the source one dimensional differential array, also referred to as a signal) may include unavoidable noise/interference/minor features, which may be present in any system, and may make detection of the interface more difficult. Therefore, to correct for the noise, L1 may be masked, for example, by multiplying L1 by a result of a threshold (e.g., a comparing function) in step S110. The threshold may be the sum of the running average (L2) (a dashed line) of the source one dimensional differential array and a constant (L3) (a light dot/dashed line). When L1 is multiplied by the result of the threshold, the resulting signal is a masked or clean signal (L4) (a bold dot/dashed line).

In step S112, the level of the sample in the container is determined based on the resulting signal. For example, the resulting signal, or (L4), may be searched for local peaks, based on peak height. The controller 112 may include an algorithm to process those peaks, for example. The algorithm may have simple rules or logic for determining the local peaks. For example, with respect to the graph shown in FIG. 2F, the peak closest to the bottom may be the bottom of the container, and the second peak from the bottom may be the first air/sample interface 110. The additional peaks may represent objects on the sample surface (e.g., bubbles or dust). For example, in the graph shown in FIG. 2F, the peak furthest from the bottom peak may be the top of foam or other foreign objects that may be present in the sample. The air/sample interface 110 is indicative of the height or level of the sample 104 in the container 106. By determining the air/sample interface 110, the algorithm may calculate the volume of sample 104 in the container 106 from the height of the sample 104 in the container 106, provided the container 106 has known dimensions. This method 200 may be preferable when the sample and ambient air are uniform and the air/sample interface is well defined.

Figure 3:
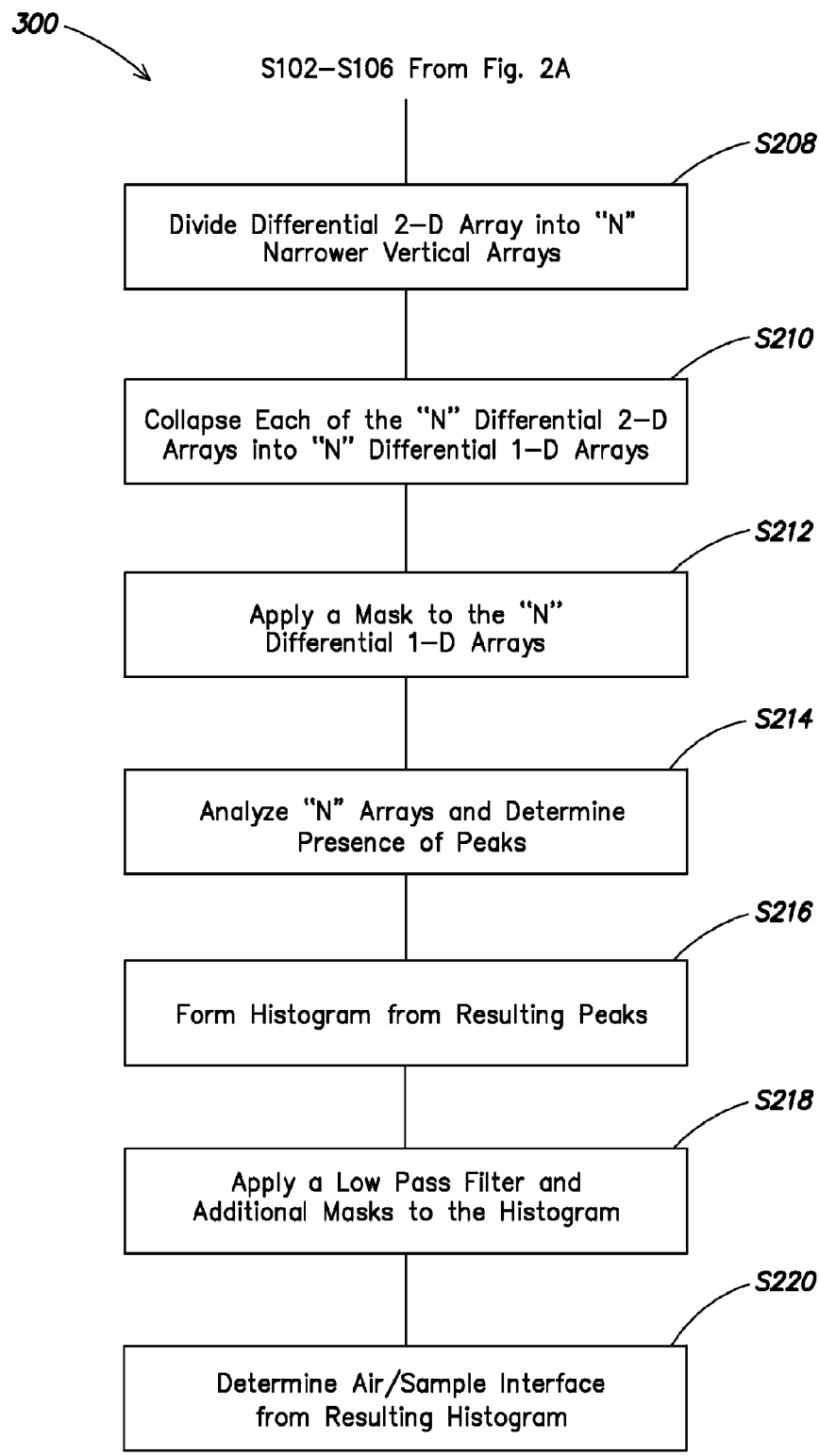
FIG. 3 is a flow chart depicting an example method in accordance with some embodiments of the present invention.

Turning to FIG. 3, a flow chart depicting an example method 300 for determining the sample level in a container using peak frequency is provided. This method 300 may be preferable when the sample contains objects that may appear to be a false air/sample interface. This false air/sample interface may be the result of foam, foreign matter and/or bubbles (distorting features), for example, or any other matter. For example, if the size of the distorting features approaches the full width of the container 104, and the contrast of the distorting features is comparable to the contrast of the main air/sample interface 110, then reliable detection of the sample level may be problematic. Therefore, to account for these distorting features, the method 200 described above with respect to FIG. 2A may be extended in method 300, described herein with respect to FIG. 3, to an additional statistical domain.

In the additional statistical domain, described in method 300 of FIG. 3, peak selection is based on the frequency of peak appearance per vertical unit (as described below), as opposed to peak selection based on peak height, as described above in method 200 and FIG. 2A. Thus, steps S202 to S206 are the same as those described above with respect to steps S102 to S106 in FIG. 2A. In other words, in step S202, the image capture apparatus 102 captures an image of the sample 104. Then in step S204, the image may be cropped and the geometry adjusted (if necessary) to extract an area of interest from the image.

In step S206, a differential filter may be applied to the area of interest. Then in step S208, the differential two dimensional array may be split or divided into "n" narrower vertical arrays. As in the method 200 described above with respect to FIG. 2A, each of the "n" differential two dimensional arrays may be collapsed horizontally into "n" one dimensional differential array in step S210. As also described above, in some embodiments, the "n" two dimensional arrays may be collapsed into the "n" one dimensional array before application of the differential filter. Each element of the differential one dimensional array may be the normalized sum (or average) of all the line elements of the divided source (two dimensional) array. As above, the differential one dimensional arrays may include noise. As in method 200, the noise may be corrected via a mask, by multiplying the differential one dimensional arrays by the result of the threshold in step S212. The controller 112 may employ an algorithm to separately analyze each of the resulting "n" masked differential one dimensional arrays to determine the presence of peaks in step S214.

In step S216, the resulting peaks may be combined and counted (per vertical unit) to form a histogram. Then in step S218, a low pass filter and additional masks may be applied to the histogram to correct for any noise. The resulting histogram may be analyzed to determine the air/sample interface 110 in step S220. For example, two or more peaks, depending in part on the number "n," in the same vertical location may be indicative of the major interface that may be the air/sample interface 110, the foam/sample interface or the foam/air interface, after the bottom of the container 104 is excluded. The air/sample interface 110 is indicative of the height or level of the sample 104 in the container 106. As described above with respect to method 200 and FIG. 2A, by determining the air/sample interface 110, the algorithm may calculate the volume of sample 104 in the container 106 from the height of the sample 104 in the container 106, provided the container 106 has known dimensions.

Figure 4:
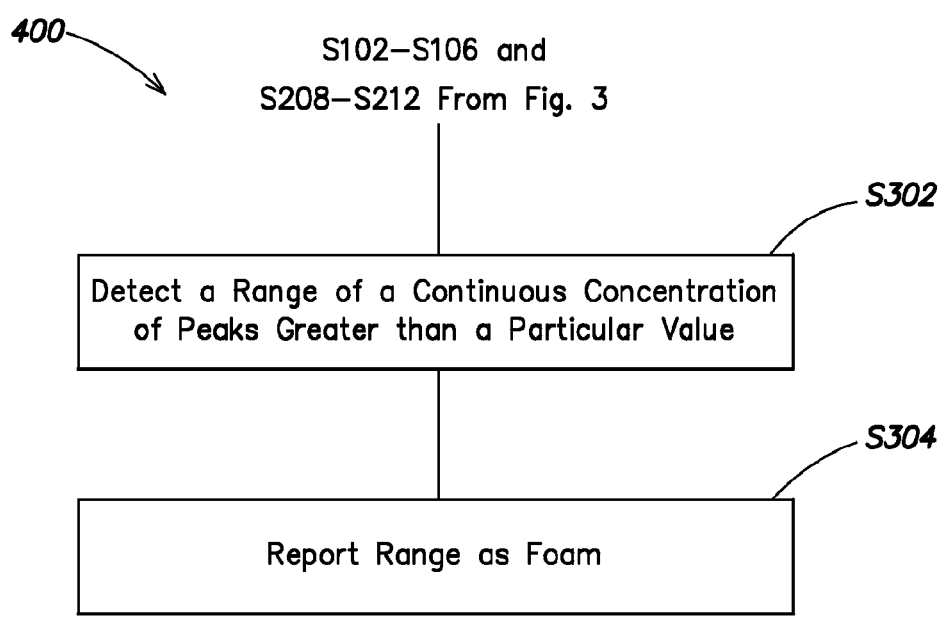
FIG. 4 is a flow chart depicting an example method in accordance with some embodiments of the present invention.

Turning to FIG. 4, a flow chart illustrating an exemplary method 400 for determining the presence and amount of foam on a surface of a sample 104 is provided. The method 400 to detect the presence and amount of foam makes use of the peak frequency method 300 described above with respect to FIG. 3. In other words, steps S102 (capturing the image) to S106 and S208 to S218 (the formation of the histogram), are included herein as the first part of the method 400. Then, in step S302, the controller 112 may employ an algorithm to examine the resulting histogram from the point of the air/sample interface 110 towards both top and bottom of the container to detect a range/span of a continuous concentration of spikes/peaks that is greater than a particular value. The particular value may be based on, for example, the expected foam size, the number "n," and the application of the low pass filter to the histogram.

If the range is found, it may be reported as foam in step S304. The range/span of the continuous concentration of peaks may indicate the width of the foam. In some instances, foam may span the horizontal width of the container. As the height of the foam may vary in such instances, so too may the volume of foam. In some embodiments, the volume of foam may be calculated as it may contain a significant amount of sample. In some instances, smaller objects, such as foreign objects and bubbles, for example, may span along a small portion of the horizontal width of the container, and may therefore not be categorized as foam.

The foregoing description discloses only exemplary embodiments of the invention. Modifications of the above disclosed apparatus and method which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

The invention claimed is:

1. A method for determining a level of a sample comprising:

capturing an image of the sample housed in a container, wherein the image is represented as a two dimensional array of intensities of light;
extracting an area of interest from the image including a bottom of the container;
applying a filter to the area of interest;
horizontally collapsing the filtered area into a one dimensional vertical array based on normalized sums of line elements in the two dimensional array for each vertical unit in the one dimensional vertical array;
masking the one dimensional vertical array;
determining the bottom of the container and a simple-air interface based on the masked one dimensional array;
and determining the level of the sample in the container based on the determined bottom of the container and the sample-air interface.

2. The method of claim 1 wherein filtering the area of interest emphasizes an air-sample interface in the sample.

3. The method of claim 1 wherein the filter is a differential filter.

4. The method of claim 1 wherein masking the one dimensional array accounts for noise in the sample, and wherein noise includes at least one of foam or dust on the surface of the sample and turbulence in the sample.

5. The method of claim 1 wherein extracting the area of interest from the image further comprises:
cropping the image.

6. The method of claim 1 wherein extracting the area of interest from the image further comprises:
adjusting the geometry of the image.

7. The method of claim 1 wherein masking the one dimensional array further comprises:
applying a threshold as a mask, wherein the threshold is comprised of the one dimensional array plus a constant to the one dimensional array.

8. The method of claim 7 wherein determining the level of the sample in the container further comprises:
searching the masked signal for local peaks.

9. A system for determining a level of a sample comprising:
an image capture apparatus adapted to capture the image of the sample in a container, wherein the image is represented as a two dimensional array of intensities of light; and
a controller coupled to the image capture apparatus, wherein the controller is adapted to extract an area of interest from the image including a bottom of the container, apply a filter to the area of interest, horizontally collapse the filtered area of interest into a one dimensional vertical array based on normalized sums of line elements in the two dimensional array for each vertical unit in the one dimensional vertical array, apply a mask to the one dimensional vertical array, determine the bottom of the container and a sample-air interface based on the masked one dimensional array, and determine the level of the sample in the container based on the determined bottom of the container and the sample-air interface.

10. The system of claim 9 wherein the filter is a differential filter.

11. The system of claim 9 wherein the system includes one or more image capture apparatus adapted to capture the image of a sample in one or more container.

12. A method for determining a level of a sample comprising:
capturing an image of the sample housed in a container, wherein the image is represented as a two dimensional array of intensities of light;
extracting an area of interest from the image including a bottom of the container;
applying a filter to the area of interest;
splitting the image into more than one narrower vertical arrays;
analyzing each vertical array for peaks;
counting and combining, per vertical unit, the peaks resulting from the analysis;
forming a histogram from the combined peaks;
analyzing the histogram for peak concentrations;
determining the bottom of the container and a sample-air interface based on the analysis; and
determining the level of the sample in the container based on the determined bottom of the container and the sample-air interface.

13. The method of claim 12 wherein determining the level of the sample in the container further comprises:
determining a bottom of the container and a sample-air interface.

14. The method of claim 12 wherein extracting the area of interest from the image further comprises:
adjusting the geometry of the image.

15. A method for determining the presence and an amount of foam on a surface of a sample comprising:
capturing an image of the sample housed in a container, wherein the image is represented as a two dimensional array of intensities of light;
extracting an area of interest from the image;
applying a filter to the area of interest;
horizontally collapsing the filtered area of interest into a one dimensional vertical array based on normalized sums of line elements in the two dimensional array for each vertical unit in the one dimensional vertical array;
masking the one dimensional vertical array;
determining a surface of the sample at an interface of the sample and ambient air based on the masked one dimensional array; and
detecting a range of continuous concentration of peaks in the one dimensional array in at least one direction moving away from the surface, wherein the continuous concentration of peaks is defined by a distance between adjacent peaks being smaller than a predefined maximum bubble size, and wherein the continuous concentration is the foam.

16. The method of claim 15 wherein the continuous concentration of peaks is greater than or equal to a particular value.

17. The method of claim 16 further comprising:
determining the amount of foam based on a width of the range of continuous concentration of peaks and a height of the foam.

18. The method of claim 15 wherein the continuous concentration of peaks are separated by a distance, and the distance is less than or equal to a preset number.

19. The method of claim 18 wherein the preset number is defined by the maximum size of bubbles.

* * * * *

UNITED STATES PATENT AND TRADEMARK OFFICE
CERTIFICATE OF CORRECTION

PATENT NO. : 9,002,096 B2  
APPLICATION NO. : 13/143353  
DATED : April 7, 2015  
INVENTOR(S) : Viatcheslav Pronkine Page 1 of 1

It is certified that error appears in the above-identified patent and that said Letters Patent is hereby corrected as shown below:

In the claims;  
In Claim 1, Col. 9, line 12, please delete "simple-air" and insert -- sample-air --.

Signed and Sealed this  
Fifteenth Day of March, 2016

Michelle K. Lee  
*Director of the United States Patent and Trademark Office*